Patented May 15, 1951

2,553,431

UNITED STATES PATENT OFFICE 2,553,431

SOLUBLE INTERPOLYMERS OF TRIS-2-AL-KENYL ACONITATES, 2-ALKENYL CHLO-RIDES, AND OLEFINIC-BENZENES

Pliny O. Tawney, Passaic, N. J., assignor to United States Rubber Company, New York, N. Y., a corporation of New Jersey No Drawing. Application April 15, 1948, Serial No. 21,322

6 Claims. (Cl. 260—78.5)

My invention is a new class of soluble, unsaturated polymeric materials prepared by the interpolymerization of a tris-2-alkenyl aconitate with a 2-alkenyl chloride and styrene or a substituted styrene as hereinafter defined. These new interpolymers are capable of further polymerization or copolymerization, particularly in the presence of heat and/or catalysts to form insoluble and essentially infusible products.

As is known in the art styrene copolymerizes readily with triallyl aconitate to form insoluble and infusible polymers after only a minor proportion of the monomers has been converted to the polymeric form. Such products are of limited utility since they ordinarily consist of a heterogeneous mixture of polymeric gel, low molecular weight polymers and unreacted monomers, which requires purification to secure a reasonably uniform and homogeneous product. Soluble interpolymers can be obtained, albeit in low yields, by halting the copolymerization before gelation occurs, but the yield of such solid copolymers cannot be effectively increased to more than a minor degree by employment of prior art devices such as large amounts of solvent, catalyst, inhibitors, etc. In all cases the major proportion of monomeric starting material, which is still present as such, must be isolated and purified for use in subsequent copolymerizations. Moreover the soluble copolymer itself must in most cases be further purified to remove catalyst fragments, inhibitors, etc.

I have now found that the amounts of the monomeric tris-2-alkenyl aconitate and the styrene convertible to the soluble copolymeric form can be very markedly increased by interpolymerization thereof with a 2-alkenyl chloride from the class of allyl, 2-methallyl, 2-ethallyl, 2-chloroallyl, 2-(hydroxymethyl) allyl, 2-chloromethyl) allyl, tiglyl, crotyl, 4-chlorocrotyl, and cinnamyl chlorides, of which those containing the terminal methylene group are preferred, e. g., allyl chloride, 2-methallyl chloride and 2-chloroallyl chloride. Other 2-alkenyl halides such as methallyl fluoride, allyl bromide and allyl iodide are operable in my invention but are effective to a lesser and varying degree. The 2-alkenyl bromides and iodides suffer the additional disadvantages of imparting poor color stability to the resulting interpolymers, particularly at elevated temperatures. Suitable tris-2-alkenyl aconitates include the esters of aconitic acid with 2-alkenyl alcohols from the class of allyl, 2-methallyl, 2-ethallyl, 2-chloroallyl, 2-(hydroxymethyl) allyl, 2-(chloromethyl) allyl, tiglyl, crotyl, 4-chlorocrotyl, and cinnamyl alcohols, and preferably with those alcohols which contain a terminal methylene group, e. g., triallyl aconitate and trimethallyl aconitate.

The styrene employed in my invention may be replaced in whole or in part by a substituted styrene from the class of alpha-methylstyrene, p-methylstyrene, p-methoxystyrene, p-chlorostyrene, and o,p-dichlorostyrene, p-trichloromethylstyrene, p-fluorostyrene, p-trifluoromethylstyrene.

In contrast to the prior art, my method is effective at moderate reaction temperatures and requires none of the special precautions, e. g., presence of inhibitors, heretofore employed by the art in attempts to avert gelation. Moreover since my reaction yields more uniform and homogeneous products, extensive purification procedures are unnecessary.

The interpolymerization reactions of my invention are carried out by heating each molar equivalent of the tris-2-alkenyl aconitate with from 0.3 to 8.0 molar equivalents of the 2-alkenyl chloride and from 0.1 to 6.0 molar equivalents of styrene or a substituted styrene, as defined above, at temperatures in the range of from 25–120° C., preferably 50–110° C., and for times sufficient to effect an adequate degree of reaction, e. g., 10–300 hours. The reaction is promoted by a source of free radicals such as a peroxidic compound including organic peroxides, e. g., acetyl peroxide, benzoyl peroxide and tert.-butyl hydroperoxide. Such promoters are usually employed in amounts of from 0.1 to 20% by weight of the reactant mixture.

The course of my interpolymerization reaction can be followed by observing the increase in viscosity in the reaction mixture and the resulting products can be isolated by precipitation with a non-solvent, e. g., n-hexane or diethyl ether or by removal of unreacted starting materials by extraction or distillation. Although it is unnecessary for most commercial applications, my products can be further purified by repeated solution in a minimum volume of a solvent such as acetone and reprecipitation with one or more of the above-mentioned non-solvents.

My new interpolymers can be employed in the solid form, e. g., as molding powders. Alternatively they may be dissolved in suitable solvents and employed as coating, impregnating and laminating compositions, particularly for various porous materials including wood and textiles. In the preparation of such solutions the crude interpolymerization reaction mixtures may be employed by the addition of suitable higher-boiling solvents and subsequent distillation to remove any unreacted 2-alkenyl chloride.

My interpolymers are particularly suited to the latter applications in view of their flame-retardant properties which are especially good when the 2-alkenyl chloride employed contains additional halogen, e. g., 2-chloroallyl chloride.

Moreover my interpolymers can be dissolved in liquid polymerizable ethylenic compounds, e. g., benzyl acrylate, tolyl acrylate, methyl acrylate, allyl acrylate, butyl methacrylate, vinyl butyrate, diethyl fumarate, and diallyl fumarate, to form solutions capable of total polymerization leaving no solvent to be evaporated. These solutions find use in molding operations where a minimum shrinkage during the final curing operation is desirable.

Application of heat, at temperatures such as 60–120° C., to compositions containing my new unsaturated interpolymers, particularly in the presence of a polymerization catalyst such as a peroxide, induces further polymerization and the resulting cross-linked products are essentially infusible and are strongly resistant to attack by solvents. Various inert addends including dyes, pigments, fillers and plasticizers can be incorporated with my interpolymers, preferably at the soluble, fusible stage prior to the final cure.

The following examples disclose my invention in more detail. All parts are by weight.

EXAMPLE 1

Mixtures of triallyl aconitate, styrene and various 2-alkenyl chlorides are heated at 60° C. in the presence of benzoyl peroxide as a catalyst until no further increase in the viscosities of the reaction mixture can be detected. The reaction products are isolated by the addition of an excess of a n-hexanediethyl ether mixture and can be further purified by solution in a minimum volume of acetone and reprecipitation with the ether-hexane mixture. The products are then dried in vacuo to constant weight. In the table below are summarized the amounts of the monomeric starting materials, the peroxide and the interpolymeric products, together with the reaction times. The table also includes an example (I–a) of the prior art copolymerization of styrene with triallyl aconitate in the absence of the 2-alkenyl chloride (I–a).

zoyl peroxide are added and heating is continued for 24 hours more.

The reaction product is isolated and purified as in Example 1 to yield approximately 139.0 parts of solid interpolymer, together with some lower molecular weight interpolymers obtained by concentration of the precipitating baths.

*Analysis.*—Found, percent Cl, 2.02; iodine number (Wijs), 139. The chlorine content of the interpolymer demonstrates the presence of interpolymerized methallyl chloride, and the iodine number indicates the residual unsaturation extant which is introduced by the interpolymerized triallyl aconitate.

Heating a sample of the interpolymer at elevated temperatures, e. g., 100° C., with 1% by weight of benzoyl peroxide cures it to a solvent- and heat-resistant product.

EXAMPLE 3

Example 1—c is repeated and found, upon analysis, to contain 11.60% chlorine, which corresponds to an interpolymer containing approximately 18.2% by weight of 2,3-dichloropropene and 81.8% of triallyl aconitate and styrene.

(a) Five parts of the interpolymer are dissolved in 6 parts of diethyl fumarate together with 0.08 part of benzoyl peroxide, and the composition is cured by heating in a mold at 60° C. for 16 hours and then at 90° C. for 16 hours to yield a clear product which is resistant to attack by acetone and alcohol.

Having thus described my invention, what I claim and desire to protect by Letters Patent is:

1. An unsaturated acetone-soluble interpolymer of 1 to 0.3 molar equivalents of a monomeric tris-2-alkenyl aconitate from the class consisting of triallyl aconitate and trimethallyl aconitate, 8 to 0.1 molar equivalents of a 2-alkenyl halide from the class consisting of allyl chloride and methallyl chloride, and 6 molar equivalents of a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene, and p-trifluoromethylstyrene.

2. An unsaturated acetone-soluble interpolymer of 1 to 0.3 molar equivalents of a monomeric tris-2-alkenyl aconitate from the class consisting of triallyl aconitate and trimethallyl aconitate,

*Table*

|   | Triallyl Aconitate | Styrene | 2-Alkenyl Chloride | | Peroxide | Reaction Time, Hours | Polymeric Product |
|---|---|---|---|---|---|---|---|
| a | 100 | 50 |  |  | 2.8 | 2,3 48.0 | 82.7 |
| b | 100 | 50 | Allyl chloride | 100.0 | 1 6.0 | 2 120.0 | 103.0 |
| c | 100 | 50 | 2,3-Dichloropropene | 100.0 | 1 6.0 | 2 120.0 | 104.0 |

1 Peroxide added incrementally at 24-hour intervals.
2 No evidence of incipient gelation but no further increase in viscosity detectable.
3 Repetition with larger amounts of peroxide effects gelation in less than 48 hours.

From the table it is readily apparent that by my invention a very large increase in the amount of the monomeric triallyl aconitate and styrene converted to the soluble polymeric form can be readily attained without danger of gelation.

EXAMPLE 2

A mixture of 200 parts of triallyl aconitate, 100 parts of styrene, 200 parts of methallyl chloride and 3 parts of benzoyl peroxide is heated at 60° C. for 24 hours, after which time 3 parts of ben- 8 to 0.1 molar equivalents of allyl chloride, and 6 molar equivalents of a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene, and p-trifluoromethylstyrene.

3. An unsaturated acetone-soluble interpolymer of 1 to 0.3 molar equivalents of a monomeric tris-2-alkenyl aconitate from the class consisting of triallyl aconitate and trimethallyl aconitate, 8 to 0.1 molar equivalents of methallyl chloride, and 6 molar equivalents of a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene, and p-trifluoromethylstyrene.

4. An unsaturated acetone-soluble interpolymer of 1 to 0.3 molar equivalents of a triallyl aconitate, 8 to 0.1 molar equivalents of allyl chloride, and 6 molar equivalents of a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene, and p-trifluoromethylstyrene.

5. An unsaturated acetone-soluble interpolymer of 1 to 0.3 molar equivalents of a triallyl aconitate, 8 to 0.1 molar equivalents of methallyl chloride, and 6 molar equivalents of a monomeric olefinic-substituted benzene selected from the class consisting of styrene, alpha-methyl-styrene, p-methylstyrene, p-methoxystyrene, p-chlorostyrene, o,p-dichlorostyrene, p-trichloromethylstyrene, p-fluorostyrene, and p-trifluoromethylstyrene.

6. A method which comprises interpolymerizing, by heating in the presence of a peroxidic polymerization catalyst a tris-2-alkenyl aconitate from the class consisting of triallyl aconitate and trimethallyl aconitate, a 2-alkenyl halide from the class consisting of allyl chloride and methallyl chloride, and a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene, and p-trifluoromethylstyrene, in the respective molar ratio of 1:0.3 to 8.0:0.1 to 6.0.

PLINY O. TAWNEY.

REFERENCES CITED

The following references are of record in the file of this patent:

UNITED STATES PATENTS

| Number | Name | Date |
|---|---|---|
| 2,221,663 | Rothrock | Nov. 12, 1940 |
| 2,378,195 | D'Alelio | June 12, 1945 |
| 2,433,616 | Marple et al. | Dec. 30, 1947 |
| 2,498,084 | Kuderna et al. | Feb. 21, 1950 |
| 2,498,099 | Tawney et al. | Feb. 21, 1950 |